United States Patent
Prien et al.

(10) Patent No.: US 12,330,495 B2
(45) Date of Patent: Jun. 17, 2025

(54) ADAPTER, MOTOR VEHICLE AND METHOD

(71) Applicant: Bayerische Motoren Werke Aktiengesellschaft, Munich (DE)

(72) Inventors: Markus Prien, Munich (DE); Andre Wagner, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/769,460

(22) PCT Filed: Oct. 6, 2020

(86) PCT No.: PCT/EP2020/077944
§ 371 (c)(1),
(2) Date: Apr. 15, 2022

(87) PCT Pub. No.: WO2021/073942
PCT Pub. Date: Apr. 22, 2021

(65) Prior Publication Data
US 2024/0123819 A1    Apr. 18, 2024

(30) Foreign Application Priority Data
Oct. 16, 2019   (DE) ............... 10 2019 127 905.4

(51) Int. Cl.
*B60K 15/04*   (2006.01)
*F16L 3/10*    (2006.01)
*B60K 15/05*   (2006.01)

(52) U.S. Cl.
CPC ............ *B60K 15/04* (2013.01); *F16L 3/1016* (2013.01); *B60K 2015/0458* (2013.01); *B60K 2015/0474* (2013.01); *B60K 2015/0553* (2013.01)

(58) Field of Classification Search
CPC ............ B60K 15/04; B60K 2015/0458; B60K 2015/0474; B60K 2015/0553; F16L 3/1016
See application file for complete search history.

(56) References Cited

U.S. PATENT DOCUMENTS 4,142,756 A * 3/1979 Henning ............ B60K 15/0406
                                           220/288
4,448,323 A * 5/1984 Hayashi ................. B60K 15/04
                                            280/834
(Continued)

FOREIGN PATENT DOCUMENTS

| CN | 108622210 A | 10/2018 |
| DE | 10 2008 034 672 A1 | 1/2010 |

(Continued)

OTHER PUBLICATIONS

International Search Report (PCT/ISA/210) issued in PCT Application No. PCT/EP2020/077944 dated Nov. 23, 2020 with English translation (six (6) pages).

(Continued)

*Primary Examiner* — Nicolas A Arnett
(74) *Attorney, Agent, or Firm* — Crowell & Moring LLP

(57) ABSTRACT

An adapter is provided for securing a filling tube of a fuel container to a body of a motor vehicle. The adapter has a contact region for placement on the body and a first securing point for securing a first holder for the filling tube. This allows for it to be easily adapted to different vehicle body shapes.

14 Claims, 2 Drawing Sheets

(56) References Cited

U.S. PATENT DOCUMENTS

| | | | | |
|---|---|---|---|---|
| 4,573,694 | A * | 3/1986 | Goto | B60K 15/04 |
| | | | | 280/834 |
| 7,594,583 | B2 * | 9/2009 | Whipple | B60K 15/04 |
| | | | | 248/74.2 |
| 8,251,439 | B2 * | 8/2012 | Yasuda | B62D 25/04 |
| | | | | 296/193.06 |
| 9,457,649 | B2 * | 10/2016 | Fujiwara | B60K 15/04 |
| 9,718,349 | B2 * | 8/2017 | Kito | B60K 15/04 |
| 9,776,501 | B2 * | 10/2017 | Dominic | B60K 15/01 |
| 10,006,565 | B2 * | 6/2018 | Kito | F16L 55/02 |
| 10,252,612 | B2 * | 4/2019 | Zhangsheng | B23K 31/02 |
| 10,486,529 | B2 * | 11/2019 | Sekihara | B60K 15/04 |
| 11,371,479 | B2 * | 6/2022 | Tomimatsu | B60K 15/04 |
| 11,440,789 | B2 * | 9/2022 | Wetzel | B67D 7/421 |
| 2013/0192714 | A1 * | 8/2013 | Wagner | B23P 19/00 |
| | | | | 141/98 |
| 2014/0103039 | A1 * | 4/2014 | Fujiwara | B60K 15/01 |
| | | | | 220/86.2 |
| 2017/0089491 | A1 * | 3/2017 | Kito | F16L 55/035 |
| 2017/0259665 | A1 * | 9/2017 | Zhangsheng | B23K 31/02 |
| 2018/0264938 | A1 | 9/2018 | Kohlmann et al. | |
| 2021/0001717 | A1 * | 1/2021 | Wilhelm | B60K 15/01 |

FOREIGN PATENT DOCUMENTS

| | | | | |
|---|---|---|---|---|
| DE | 10 2008 036 869 A1 | 2/2010 | | |
| DE | 10 2011 115 144 A1 | 3/2013 | | |
| JP | 2001071761 A | * | 3/2001 | ............ B60K 15/04 |
| JP | 2011-133003 A | 7/2011 | | |
| KR | 1998-039349 U | 9/1998 | | |
| WO | WO 2019/191233 A1 | 10/2019 | | |

OTHER PUBLICATIONS

German-language Written Opinion (PCT/ISA/237) issued in PCT Application No. PCT/EP2020/077944 dated Nov. 23, 2020 (five (5) pages).

German-language Search Report issued in German Application No. 10 2019 127 905.4 dated Nov. 11, 2020 with partial English translation (11 pages).

Chinese-language Office Action issued in Chinese Application No. 202080072594.0 dated Jan. 12, 2025 with English translation (18 pages).

Chinese-language Office Action issued in Chinese Application No. 202080072594.0 dated Mar. 21, 2025 with English translation (15 pages).

* cited by examiner

ADAPTER, MOTOR VEHICLE AND METHOD

BACKGROUND AND SUMMARY

The technology disclosed herein relates to an adapter, a motor vehicle and an associated method.

Motor vehicles are typically produced in such a way that different vehicle body shapes are available for one motor vehicle model. For example, these can be embodiments as a limousine, station wagon, coupe or cabrio. Motor vehicles are typically equipped with filler tubes for operating medium tanks, it being possible, for example, for liquid fuels or else other operating media such as water or additives for improving the exhaust gas purification to be poured in. Here, a special holder which is adapted to the respective vehicle body shape is typically required for each vehicle body shape, which holder serves to fasten the respective filler tube. As a result, a high complexity is produced in the case of production and storage.

It is one preferred problem of the technology disclosed herein to reduce or to eliminate at least one disadvantage of a previously known solution or to propose an alternative solution. It is, in particular, one preferred problem of the technology disclosed herein to decrease the complexity in the case of fastening of filler tubes to vehicle bodies. Further preferred problems can result from the advantageous effects of the technology which is disclosed herein. The problems are solved by way of the subject matter of the independent patent claims. The dependent claims show preferred refinements.

The technology disclosed herein relates to an adapter for fastening a filler tube of an operating medium tank to a vehicle body of a motor vehicle. The adapter has at least one bearing region for bearing against the vehicle body. Furthermore, the adapter has at least one first fastening point for fastening a first holder for the filler tube.

By means of an adapter of this type, filler tubes can be fastened to different vehicle body shapes, without holders which are adapted specifically for this purpose being required. The same holders can be used for all vehicle body shapes, any differences between the vehicle body shapes being compensated for by way of the adapter. Here, different adapters are typically available for different vehicle bodies.

The fastening point can be, in particular, a dedicated point on the adapter which is configured for attaching the holder. A fastening point of this type can typically be recognized with the aid of a structural configuration for attaching the holder. Here, in particular, the holder can bring about fastening of a filler tube, with the result that ultimately the filler tube is fastened to the vehicle body. To this end, the adapter can also be configured, in particular, to be fastened itself to the vehicle body.

Furthermore, the adapter preferably has a second fastening point for fastening a second holder for the filler tube. As a result, a second holder can be used, as a result of which the fastening is improved. More than two holders can also be used; accordingly, more than two fastening points can also be provided.

It is to be mentioned that a plurality of filler tubes can also be fastened via respective holders to an adapter. A holder can also, for example, be fastened to another holder and can therefore be fastened only indirectly to the adapter. One holder for a plurality of filler tubes can also be provided.

The bearing region or the bearing regions can be arranged on one or more respective projections which can project, in particular, from a recessed surface. Here, a force can be introduced into the vehicle body specifically on the bearing regions, and the recessed surface can be spaced apart from the vehicle body in the installed state, as a result of which corrosion is avoided.

In the case of the adapter, the recessed surface is recessed, in particular, in relation to the bearing regions or the bearing region. The projections can, for example, also be called bearing elements. They preferably project from the recessed surface.

In accordance with one possible embodiment, there can be only one bearing region. This bearing region can, for example, configure a bearing surface, and the latter can, in particular, be shaped in a curved manner. As a result, a satisfactory adaptation to a likewise curved vehicle body shape can be achieved. Bearing regions can also otherwise be shaped in a curved manner. Instead of curved, for example, the term arched or the term curve-shaped can also be used.

In particular, a plurality of bearing regions can also be provided, however. They can be spaced apart from one another, for example, with the result that they bear separately against the vehicle body in the installed state. The bearing regions can be configured, for example, on respective projections of the adapter. For example, star-shaped projections, cylindrical projections, cuboid projections or wall-shaped projections can be used. Here, the shape can relate, in particular, to a top view of the recessed surface or to a perspective view.

The use of a plurality of separate bearing regions has the advantage, in particular, that corrosion formation is avoided.

In particular, a force can be introduced into the vehicle body via the bearing regions and possibly the projections which are connected to them. This can take place, in particular, independently of a fastening of the adapter to the vehicle body, which fastening can take place by means of bolts, for example.

In accordance with one embodiment, a first bore for receiving a first fastening bolt for the first holder is situated at the first fastening point. In accordance with one embodiment, a second bore for receiving a second fastening bolt for the second holder is situated at the second fastening point. By means of bores of this type, fastening bolts can be screwed into the respective bore, by way of which the respective holders can be fastened. The bores can have respective internal threads, in particular.

In accordance with one embodiment, a first fastening bolt for the first holder is screwed in, inserted, welded, riveted, stamped or overmolded at the first fastening point. In accordance with one embodiment, a second fastening bolt for the second holder is screwed in, inserted, welded, riveted, stamped or overmolded at the second fastening point. Embodiments of this type can be prefabricated, in particular, and/or can be provided ex works. An advantageous fastening of the respective holder can likewise be achieved as a result.

In accordance with one embodiment, a first thread for receiving a first screw for the first holder is situated at the first fastening point. In accordance with one embodiment, a second thread for receiving a second screw for the second holder is situated at the second fastening point. By means of threads of this type, screws can be used which are screwed into the respective thread, as a result of which the respective holder is fastened in a simple and reliable way.

The adapter can be configured, for example, from plastic or from metal. Materials of this type have proven themselves for typical applications; it is to be mentioned that other materials can also be used.

The adapter can be configured, for example, from an electrically conductive material. This allows a direct discharge of an electrostatic charge via the adapter.

The adapter can have an electrically conductive connection between the first fastening point and at least one bearing region and/or the vehicle body. The adapter can also have an electrically conductive connection between the second fastening point and at least one bearing region and/or the vehicle body. As a result, the respective fastening points can be connected electrically to the bearing region and/or the vehicle body, with the result that holders which are connected thereto can likewise be connected electrically, and a direct discharge of electrostatic charge toward the vehicle body is therefore possible. An electrically conductive connection can be configured, for example, as a cable. The connection to the vehicle body relates, in particular, to an installed state.

The adapter can preferably have one or more attachment points for connecting to the vehicle body of the motor vehicle. Respective through bores or attachment openings, in particular also with an internal thread, for plugging through or screwing in fastening means such as screws or bolts for connecting to the vehicle body can be provided, for example, at these attachment points. In particular, there can be two attachment points of this type. As an alternative or in addition, however, the adapter can also be held by fastening means which are connected directly to the vehicle body and can hold the adapter in a positively locking manner, for example.

The technology disclosed herein relates, furthermore, to a motor vehicle. The motor vehicle has a vehicle body. It has a filler tube of an operating medium tank. The motor vehicle has an adapter as described herein. With regard to the adapter, reference can be made to all the embodiments and variants described herein. The motor vehicle has a first holder.

The adapter bears with its bearing region or its bearing regions against the vehicle body. The first holder is fastened to the filler tube and the first fastening point of the adapter.

In the case of the motor vehicle which is described herein, an advantageous fastening of a filler tube of an operating medium tank can therefore be achieved, different holders for different vehicle bodies not being required. Rather, the provision of additional adapters is sufficient to take account of different vehicle body shapes.

The adapter is preferably fastened to the vehicle body.

In accordance with one embodiment, furthermore, the motor vehicle has a second holder, the second holder being fastened to the filler tube and a second fastening point of the adapter. As a result, the fastening and/or the stability can be improved further.

In accordance with one embodiment, furthermore, the motor vehicle has a second filler tube of an operating medium tank, it being possible for the second filler tube to be connected to the same operating medium tank or else to another operating medium tank. The second filler tube is fastened by means of one or more further holders to the adapter. To this end, for example, suitable further fastening points can be provided on the adapter, which further fastening points can be configured, for example, like the above-described fastening points. The holders for the second filler tube can also be fastened, however, completely or in part to the same fastening points as the holders of the filler tube or to different holders. It is to be mentioned that the use of a second adapter for the second filler tube is fundamentally also possible.

The adapter can be fastened to the vehicle body, in particular, by means of screws, bolts or nuts. This permits a simple and reliable fastening and introduction of force into the vehicle body.

The adapter can bear, in particular, with a plurality of bearing regions which are spaced apart from one another against the vehicle body.

A recessed surface which is spaced apart from the vehicle body in the installed state can be configured in the adapter. For example, a plurality of bearing regions can project from the recessed surface toward the vehicle body, for example by means of the abovementioned projections. The bearing regions can therefore, in particular, bear against the vehicle body not only as one surface, but rather spaced apart from one another. By way of embodiments of this type, corrosion can be prevented and, nevertheless, force can be introduced over a relatively wide region into the vehicle body.

The technology disclosed herein relates, furthermore, to a method for producing a plurality of motor vehicles as described herein. Reference can be made to all the embodiments and variants described herein with regard to the motor vehicles.

Here, each motor vehicle is produced with a vehicle body which is selected from a quantity of two or more different vehicle body shapes. Each motor vehicle is produced with a filler tube and with a holder or with two or more holders which are of identical configuration for all motor vehicles. Each motor vehicle is produced with an adapter which is selected from a quantity of two or more different adapter shapes, each vehicle body shape being assigned precisely one adapter shape to be used.

By means of a method of this type, the advantages described herein can be achieved in a particular way, since different vehicle body shapes can be used with identical holders, and merely different adapters are to be used.

It is to be understood that, for example, two different holders can also be used per motor vehicle. These holders are then expediently used in an identical way for all motor vehicles, however.

An operating medium tank can be configured, in particular, for storing an operating medium. The operating medium tank therefore configures the substantially fluid-tight outer shell of storage volume, and delimits the storage volume with respect to the installation space. In the case of plastic tanks, this is called a blow-molded element, for example. In the case of steel tanks, the operating medium tank can be configured, for example, from two metal layers. The operating medium tank can advantageously have a saddle shape, with a main chamber and an auxiliary chamber which are connected to one another via a connecting region. A filler neck can be connected to the operating medium tank, in order to pour in operating medium.

In other words, for example, an adapter bracket made from plastic can be provided with an electrostatic discharge between the screwing point of the filler tube and the fastening point of the vehicle body. A fastening point for the filling tube/filling system with two metric thread bolts and two attachment points or attachment openings on the vehicle body for bolts which are fixed to the body with pressed-in metal bushes can be provided.

The technology disclosed herein will now be explained on the basis of the figures.

DETAILED DESCRIPTION OF THE DRAWINGS

Figure 1:
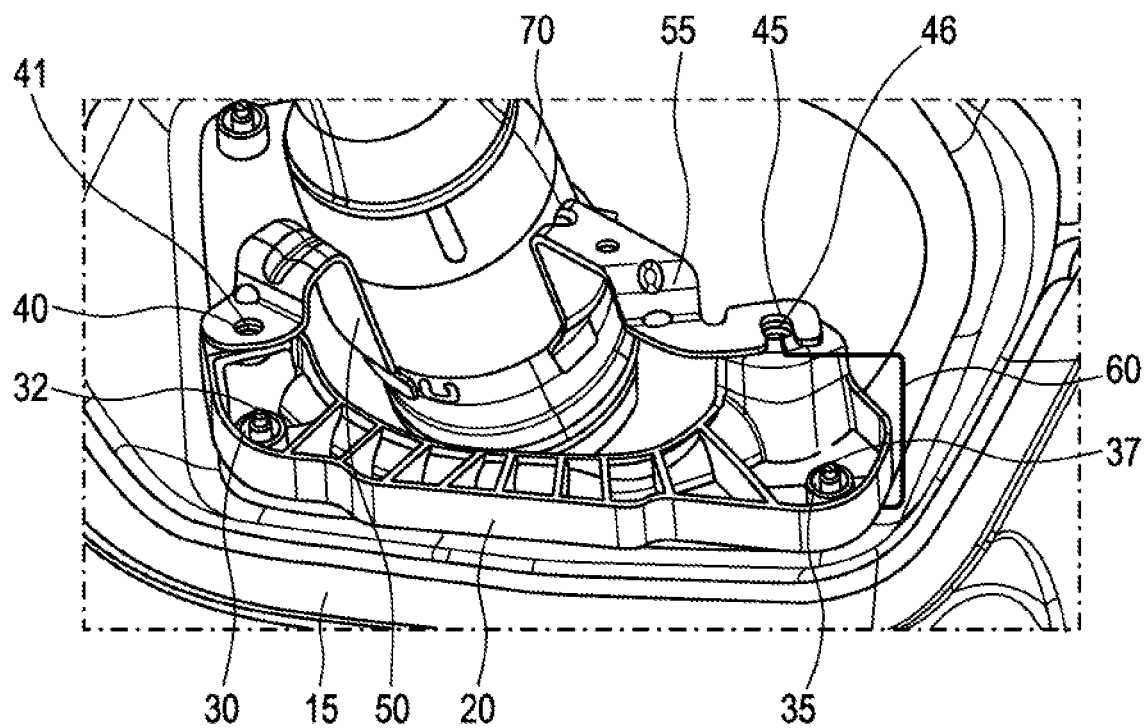
FIG. 1 is a detail from a motor vehicle with an adapter in an installed situation.

FIG. 1 shows a detail from a motor vehicle 10 in accordance with one exemplary embodiment. The motor vehicle 10 has a vehicle body 15, of which merely one part is shown, namely a part surrounding the other components which are shown. The vehicle body 15 can be a vehicle body with a defined vehicle body shape which can be, for example, a vehicle body in accordance with a sedan, a station wagon, a cabrio or a coupe.

The motor vehicle 10 has an adapter 20. The latter is connected to the vehicle body 15, to be precise by means of a first attachment opening at a first attachment point 30 and a second attachment opening at a second attachment point 35, a first vehicle body connecting bolt 32 being arranged in the first attachment opening and a second vehicle body connecting bolt 37 being arranged in the second attachment opening. The two vehicle body connecting bolts 32, 37 are connected to the vehicle body 15 and therefore fasten the adapter 20 to the vehicle body 15.

The motor vehicle 10 has a filler tube 70, of which merely one part is shown in FIG. 1 and which is connected to an operating medium tank (not shown). The operating medium tank can store, for example, fuel for operating the motor vehicle 10, and this fuel can be poured in via the filler tube 70.

The motor vehicle 10 has a first holder 50 and a second holder 55. The first holder 50 is fastened to the adapter 20 at a first fastening point 40 of the latter. The second holder 55 is fastened to the adapter 20 at a second fastening point 45 of the latter. As is shown, the adapter 20 in each case has, at the two fastening points 40, 45, a bore 41, 46 with a respective thread, into which a respective bolt can be screwed. These bolts are not shown in FIG. 1, in order that the fastening points 40, 45 and the threads which are configured therein can be seen. If the respective bolt is screwed in, the respective holder 50, 55 can be fastened to the respective fastening point 40, 45 in this way.

The respective holders 50, 55 are fastened to the filler tube 70 so as to lie opposite the adapter 20, with the result that ultimately the filler tube 70 is fastened via the holders 50, 55 and the adapter 20 to the vehicle body 15.

The adapter 20 bears with bearing regions which cannot be seen in FIG. 1 against the vehicle body 15; this will be described in greater detail further below with reference to FIG. 3.

In the present case, an electrically conductive connection 60 is configured from the second fastening point 45 to the bearing region or to the vehicle body 15, by means of which electrically conductive connection 60 any electrostatic charge can be discharged from the filler tube 70 into the vehicle body 15. To this end, the electrically conductive connection 60 is directly connected firstly to the vehicle body 15 and secondly to the second holder 55, the latter being made from metal and therefore likewise being electrically conductive. It is to be understood that, as an alternative to the embodiment which is shown or else in addition to this, a corresponding electrically conductive connection can also be provided between the first fastening point 40 and the bearing region or the vehicle body 15, or that the adapter 20 can also for its part be configured from an electrically conductive material, for example from a metal or an electrically conductive plastic.

Figure 2:
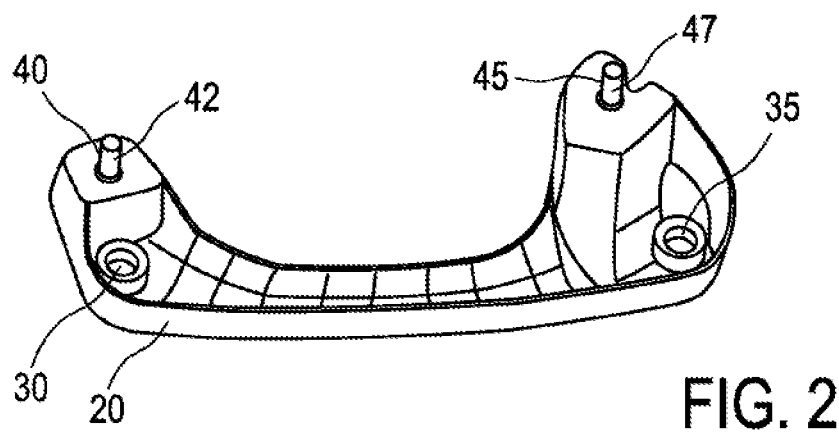
FIG. 2 illustrates the adapter in a first view.

FIG. 2 shows the adapter 20 separately. Here, the attachment openings at the attachment points 30, 35 can be seen separately. The fastening points 40, 45 can likewise be seen, respective fastening bolts 42, 47 having been screwed in the present case into the bores which have already been described with reference to FIG. 1. These fastening bolts 42, 47 serve to fasten the holders 50, 55.

Figure 3:
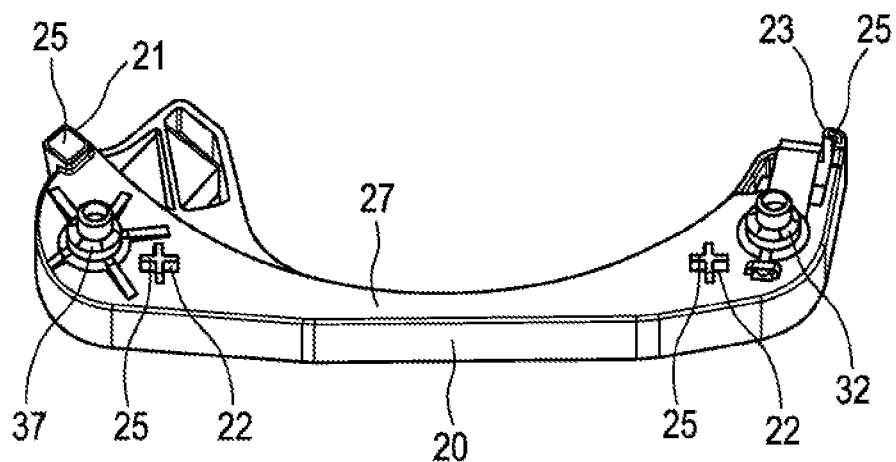
FIG. 3 illustrates the adapter in a second view.

FIG. 3 shows the adapter 20 from a different view. It can be seen here that the adapter 20 (as has already been mentioned further above) has bearing regions 25 which face the vehicle body 15 in the installed state of FIG. 1. In the present case, four bearing regions 25 are configured which bear directly against the vehicle body 15 in the installed state and can introduce forces. Here, the bearing regions 25 are configured on respective projections which project from a recessed surface 27. Here, one bearing region 25 is configured on a cuboid projection 21. Two bearing regions 25 are configured on star-shaped projections 22. One bearing region 25 is configured on a wall-shaped projection 23. This achieves a situation where the adapter 20 does not bear against the vehicle body 15 over the full surface area and corrosion is therefore avoided. In particular, the recessed surface 27 is spaced apart from the vehicle body 15. Other shapes of projections are also possible, however.

The two vehicle body connecting bolts 32, 37 which have already been mentioned with reference to FIG. 1 can also be seen in FIG. 3, to be precise substantially with their elements which, in the installed state, lie on a side of the vehicle body 15 which faces away from the adapter 20. As a result, they hold the adapter 20 on the vehicle body 15. Forces can at the same time be introduced into the vehicle body 15 by way of the bearing regions 25 which bear against the vehicle body 15, which forces are distributed over a certain area on account of the plurality of bearing regions 25, without full surface contact of the adapter 20 being necessary.

For reasons of legibility, the expression "at least one" has been partially omitted for simplification purposes. If a feature of the technology disclosed herein is described in the singular or with an indefinite article (for example, the/a filler tube, the/a holder, etc.), its plural is also intended to be disclosed at the same time (for example, the at least one filling tube, the at least one holder, etc.).

The preceding description of the present invention serves only for illustrative purposes and not for the purpose of the restriction of the invention. Within the context of the invention, different amendments and modifications are possible without departing from the scope of the invention and its equivalents.

LIST OF DESIGNATIONS

10: Motor vehicle
15: Vehicle body
20: Adapter
21, 22, 23: Projections
25: Bearing region
27: Recessed surface
30, 35: Attachment points
32, 37: Vehicle body connecting bolts
40, 45: Fastening points
41, 46: Bores
42, 47: Fastening bolts
50, 55: Holders
60: Electrically conductive connection

What is claimed is:

1. An adapter for fastening a filler tube of an operating medium tank on a vehicle body of a motor vehicle, comprising:
   at least one bearing region for bearing against the vehicle body;
   at least one first fastening point for fastening a first holder for the filler tube, wherein
   the bearing region, or multiple bearing regions, is/are arranged on one or more respective projections which project from a recessed surface, and of which at least one is of star-shaped, cylindrical, or cuboid configuration.

2. The adapter according to claim 1, wherein
   a plurality of or all of the projections are of star-shaped, cylindrical, or cuboid configuration.

3. The adapter according to claim 1, further comprising:
   a second fastening point for fastening a second holder for the filler tube.

4. The adapter according to claim 3, further comprising:
   a first bore for receiving a first fastening bolt for the first holder situated at the first fastening point, and/or
   a second bore for receiving a second fastening bolt for the second holder situated at the second fastening point.

5. The adapter according to claim 3, further comprising:
   a first fastening bolt for the first holder screwed in, inserted, welded, riveted, stamped or overmolded at the first fastening point, and/or
   a second fastening bolt for the second holder screwed in, inserted, welded, riveted, stamped or overmolded at the second fastening point.

6. The adapter according to claim 3, further comprising:
   a first thread for receiving a first screw for the first holder situated at the first fastening point, and/or
   a second thread for receiving a second screw for the second holder situated at the second fastening point.

7. The adapter according to claim 3, wherein
   the adapter has an electrically conductive connection between the first fastening point and at least one bearing region and/or the vehicle body, and/or
   the adapter has an electrically conductive connection between the second fastening point and at least one bearing region and/or the vehicle body.

8. The adapter according to claim 1, wherein
   the adapter is configured from plastic or metal.

9. The adapter according to claim 1, wherein
   the adapter has one or more attachment points for connection to the vehicle body of the motor vehicle.

10. A motor vehicle, comprising
    a vehicle body;
    a filler tube of an operating medium tank;
    an adapter according to claim 1;
    a first holder, wherein
    the adapter bears with its bearing region or its bearing regions against the vehicle body, and
    the first holder is fastened to the filler tube and the first fastening point of the adapter.

11. The motor vehicle according to claim 10, further comprising:
    a second holder, wherein
    the second holder is fastened to the filler tube and a second fastening point of the adapter.

12. The motor vehicle according to claim 10, further comprising:
    a second filler tube of an operating medium tank, wherein
    the second filler tube is fastened by way of one or more further holders to the adapter.

13. The motor vehicle according to claim 10, wherein
    the adapter bears with a plurality of bearing regions which are spaced apart from one another against the vehicle body.

14. A method for producing a plurality of motor vehicles, the method comprising
    producing each motor vehicle with a vehicle body which is selected from a quantity of two or more different vehicle body shapes,
    producing each motor vehicle with a filler tube of an operating medium tank and with a holder or with two or more holders which are of identical configuration for all the motor vehicles, and
    providing each motor vehicle with an adapter which is selected from a quantity of two or more different adapter shapes, each vehicle body shape being assigned precisely one adapter shape to be used, the adapter bearing with its bearing region or bearing regions against the vehicle body, the holder or one of the two or more holders fastened to the filler tube and a first fastening point of the adapter,
    wherein the adapter comprises: at least one bearing region for bearing against the vehicle body; and at least one first fastening point for fastening a first holder for the filler tube, wherein the bearing region, or multiple bearing regions, is/are arranged on one or more respective projections which project from a recessed surface, and of which at least one is of star-shaped, cylindrical, cuboid or wall-shaped configuration.

\* \* \* \* \*